United States Patent

Schwery et al.

(10) Patent No.: US 8,872,406 B2
(45) Date of Patent: Oct. 28, 2014

(54) SLIP-RING ARRANGEMENT FOR A ROTATING ELECTRICAL MACHINE

(75) Inventors: Alexander Schwery, Kuettigen (CH); Naoki Ricardo Okai, Fislisbach (CH); Stefan Baumeister, Rheinheim (DE)

(73) Assignee: Alstom Renewable Technologies, Grenoble (FR)

( * ) Notice: Subject to any disclaimer, the term of this patent is extended or adjusted under 35 U.S.C. 154(b) by 152 days.

(21) Appl. No.: 13/371,568

(22) Filed: Feb. 13, 2012

(65) Prior Publication Data

US 2012/0200194 A1 Aug. 9, 2012

Related U.S. Application Data

(63) Continuation of application No. PCT/EP2010/061569, filed on Aug. 10, 2010.

(30) Foreign Application Priority Data

Aug. 13, 2009 (DE) .......................... 10 2009 037 052
Oct. 5, 2009 (DE) .......................... 10 2009 048 265

(51) Int. Cl.
*H02K 9/28* (2006.01)
*H02K 13/00* (2006.01)
*H01R 39/08* (2006.01)

(52) U.S. Cl.
CPC ................ *H02K 9/28* (2013.01); *H02K 13/006* (2013.01)
USPC ........................................ 310/227; 310/232

(58) Field of Classification Search
CPC .......... H02K 9/28; H02K 13/003; H01R 39/08
USPC .................................................. 310/227, 232
See application file for complete search history.

(56) References Cited

U.S. PATENT DOCUMENTS

| 2,404,969 | A | * | 7/1946 | Liddington | .................... 310/232 |
| 4,137,474 | A | * | 1/1979 | Krieger | ......................... 310/227 |
| 4,410,821 | A | | 10/1983 | Kurt | |
| 5,982,072 | A | | 11/1999 | Sung | |

FOREIGN PATENT DOCUMENTS

| CH | 342635 A | 11/1959 | |
| DE | 2056898 A1 | 5/1972 | |
| DE | 2529519 A1 | 1/1977 | |
| DE | 3232102 A1 | 3/1984 | |
| DE | 8514756 U1 | 8/1985 | |
| EP | 0052385 A1 | 5/1982 | |
| EP | 344464 A1 * | 12/1989 | ............ H01R 39/14 |
| JP | 58108947 A * | 6/1983 | ............... H02K 9/28 |
| JP | 04104487 A * | 4/1992 | ............ H01R 39/08 |

OTHER PUBLICATIONS

KIPKE, DE2529519 Machine Translation, Jan. 1977.*
European Patent Office, International Search Report in International Patent Application No. PCT/EP2010/061569 (Jan. 21, 2012)

* cited by examiner

*Primary Examiner* — Burton Mullins
*Assistant Examiner* — Eric Johnson
(74) *Attorney, Agent, or Firm* — Buchanan Ingersoll & Rooney PC

(57) ABSTRACT

A slip-ring arrangement of a rotating electrical machine includes a plurality of slip-rings disposed concentrically about an axis of the electrical machine one behind the other in an axial direction, the plurality of slip-rings configured to be self-supporting.

14 Claims, 4 Drawing Sheets

SLIP-RING ARRANGEMENT FOR A ROTATING ELECTRICAL MACHINE

CROSS REFERENCE TO PRIOR APPLICATIONS

This application is a continuation of International Patent Application No. PCT/EP2010/061569, filed on Aug. 10, 2010, which claims benefit to German Patent Application Nos. 10 2009 037 052.8, filed on Aug. 13, 2009 and 10 2009 048 265.2, filed on Oct. 5, 2009. The entire disclosure of each of these applications is incorporated by reference herein.

FIELD

The present invention relates to the field of rotating electrical machines.

BACKGROUND

In the case of rotating electrical machines having slip-rings, for example a polyphase asynchronous motor in the form of a slip-ring rotor, currents are transmitted by means of appropriate brushes via the slip-rings which rotate with the shaft. One example of a rotating electrical machine such as this is illustrated, partially, in FIG. 1. The rotating electrical machine 10 illustrated there, with its machine axis 17, comprises a rotor, which can rotate about the machine axis 17, with a central body 11 which merges at the end into a shaft 16. A rotor laminated body 12 is seated on the central body 11 and a rotor winding 13 is accommodated in it, which rotor winding 13 has a rotor end winding 13' at the end. The rotor 11, 12, 13 is concentrically surrounded by a stator laminated body 15, in which a stator winding with a corresponding stator end winding 15' is accommodated. A plurality of (four) slip-rings 14 are arranged on the outside of the shaft 16 and are used to transmit current between the rotor and the outside world. In the case of the machine illustrated in FIG. 1, the power loss must be dissipated by means of specific cooling devices.

When machines of this type are highly loaded, particular attention must be paid to cooling in the area of the slip-rings. Because of the high electric and mechanical (friction) load on the brushes and the slip-rings 14, an increased temperature development occurs in this area. Since the brushes react by increased wear to any discrepancy from the optimum operating temperature, and can be completely destroyed above a critical temperature, appropriate cooling must be provided for these components.

As is shown in FIG. 2, the conventional design of the slip-ring area envisages a continuous shaft 16 on which the slip-rings 14 are mounted. With this design, the slip-rings 14 can be cooled only to a highly restricted extent. The cooling air (or some other cooling medium) would have to flow onto the slip-rings 14 from the outside. However, this is difficult because the slip-rings 14 rotate. Cooling from the interior, with the air flowing radially outwards from the interior of the shaft 16, is impossible because of the closed shaft 16. On the other hand, it is problematic for mechanical strength reasons to provide the shaft 16 with an appropriately large number of openings.

EP-A1-0 052 385 describes a slip-ring arrangement for electrical machines, in which the slip-rings are provided with axial cooling gas holes, which are cut in the form of grooves or slots in the slip-ring surface. Cooling gas passes radially outwards via the grooves or slots into the cooling gas holes, with heat being absorbed, and is dissipated via these holes by means of a suction fan. However, the design of a cooling configuration such as this is very complex.

In order to improve the cooling in the area of the slip-ring arrangement, DE-A1-32 32 102 describes that each slip-ring be subdivided into a number of individual slip-rings, which are shrunk onto intermediate shrink rings which are isolated from the slip-ring shaft. Cooling air fans are arranged in front and behind the slip-rings on the intermediate shrink rings. This solution also involves a complicated design, and very demanding cooling air routing.

SUMMARY

In an embodiment, the present invention provides a slip-ring arrangement of a rotating electrical machine. The slip-ring arrangement includes a plurality of slip-rings disposed concentrically about an axis of the electrical machine one behind the other in an axial direction, the plurality of slip-rings configured to be self-supporting.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
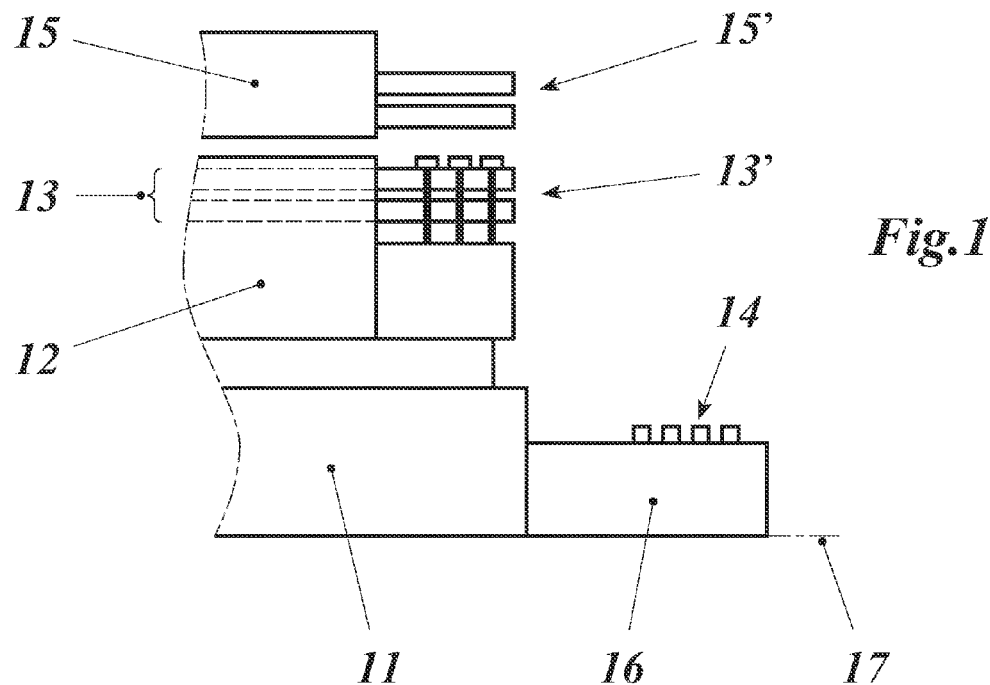
FIG. 1 shows a detail of an example of a rotating electrical machine with a slip-ring arrangement of a conventional type.

An aspect of the present invention is to provide a slip-ring arrangement which avoids the disadvantages of the known slip-ring arrangements in terms of cooling and which is distinguished in particular by a simple design and very simple and effective cooling, and to specify a method for cooling of this arrangement.

One feature according to an embodiment of the invention is that the slip-ring arrangement is designed to be self-supporting. The self-supporting design of the slip-ring arrangement makes it possible to dispense with a supporting shaft in this area. On the one hand, this results in the slip-rings being highly accessible from all sides, for the contact with a cooling medium. On the other hand, the slip-ring arrangement can be designed to be flexible with a major weight saving, resulting in considerable advantages with respect to the bearing for the machine shaft.

One embodiment of the slip-ring arrangement according to the invention is distinguished in that the slip-rings are connected to one another forming through-flow openings, which are arranged between the slip-rings, for a cooling medium, in particular cooling air, and are kept separated by spacers which are arranged between the slip-rings.

In particular in an embodiment, the spacers may comprise spacer rings which have additional spacing elements distributed over the circumference.

In this case, the cooling medium is routed in a particularly advantageous manner if the additional spacing elements project in the axial direction on both sides of the respective spacer ring, and the additional spacing elements are integrally formed on the respective spacer ring.

According to another embodiment of the invention, however, it is also feasible for the spacers to have spacing elements which are arranged distributed over the circumference.

In this case, preferably, the slip-ring arrangement is held together by a plurality of axial tie bolts which are arranged distributed over the circumference, with the tie bolts being passed through the slip-rings and the spacing elements.

In an embodiment, the slip-ring arrangement is particularly robust if the slip-rings and the spacing elements which are arranged between the slip-rings are pressed together by means of the tie bolts between two end rings which act as pressing flanges.

In a further embodiment of the invention, the slip-rings are each subdivided into a plurality of separate sub-rings which are arranged concentrically and one behind the other in the axial direction, are connected to one another forming through-flow openings which are arranged between the sub-rings for a cooling medium, in particular cooling air, and kept separated by spacers which are arranged between the sub-rings.

This allows the slip-rings to be cooled even more effectively.

Preferably, the spacers for the sub-rings comprise spacing elements which are arranged distributed over the circumference.

In another embodiment of the invention, the slip-ring arrangement surrounds an internal area, and in that output conductors are routed from the slip-rings to the machine-side end of the slip-ring arrangement in the internal area. This makes it possible to also extend the effective cooling to the output conductors.

In an embodiment, a method according to the invention for cooling of a slip-ring arrangement according to the invention is characterized in that a cooling medium, in particular cooling air, is introduced in the axial direction into the interior of the slip-ring arrangement, and emerges radially again between the slip-rings and sub-rings.

Figure 2:
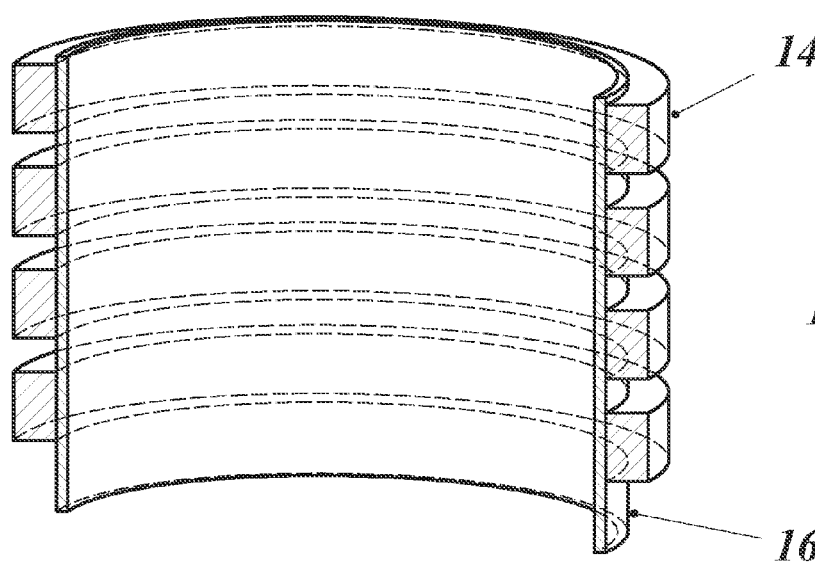
FIG. 2 shows the section through a slip-ring arrangement of a conventional type, in the form of a dashed illustration and a flat illustration.
Figure 3:
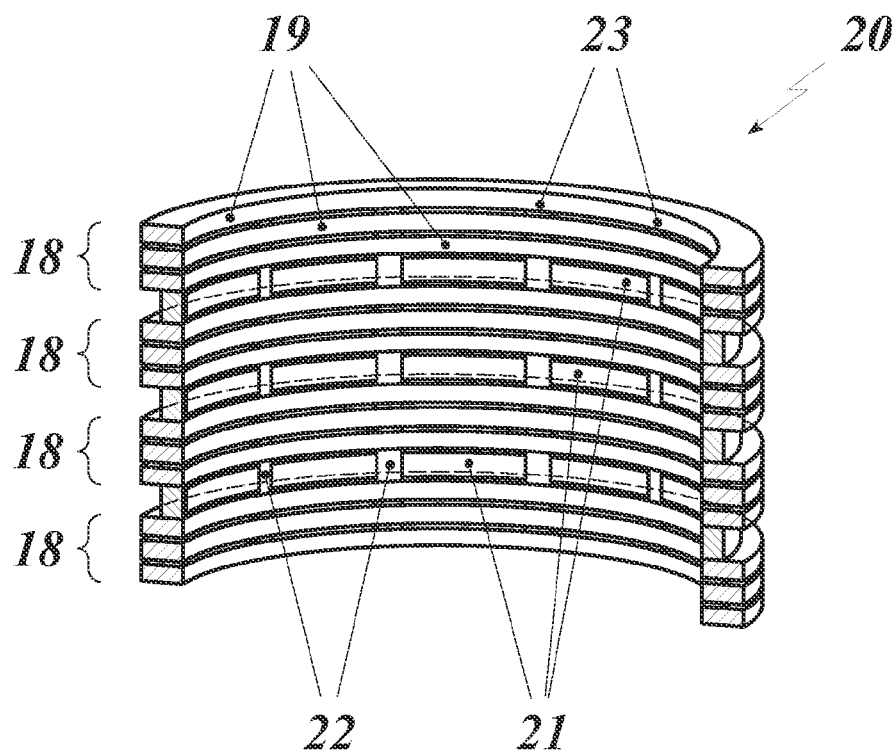
FIG. 3 shows an illustration, comparable to that in FIG. 2, of a slip-ring arrangement according to a first exemplary embodiment of the invention.
Figure 4:
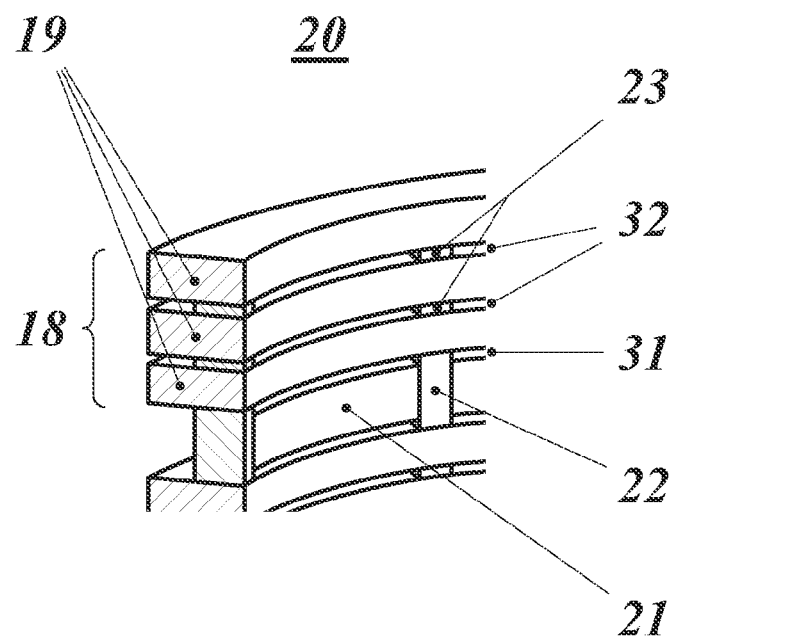
FIG. 4 shows a detail view of the slip-ring arrangement shown in FIG. 3.

In an illustration comparable to FIG. 2, FIG. 3 and FIG. 4 show a slip-ring arrangement according to a first exemplary embodiment of the invention. In the new design of the slip-ring arrangement 20, there is no shaft whatsoever as a support for the slip-ring 18. The slip-rings 18 can be arranged concentrically one above the other, that is to say one behind the other in the axial direction, and can be spatially separated from one another by means of spacer rings 21 located between them. The slip-rings 18 and the spacer rings 21 thus form a self-supporting slip-ring arrangement. Spacing elements 22 which project on both sides of the spacer ring 21, distributed uniformly over the circumference, are integrally formed on the spacer rings 21 and ensure that annular gap sections are created between each of the spacer rings 21 and the adjacent slip-rings 18, through which a cooling medium can flow radially along the sides of the slip-rings 18, and can absorb heat.

However, in the slip-ring arrangement 20 shown in FIG. 3 and FIG. 4, not only are the individual slip-rings 18 separated from one another by spacer rings 21, but the individual slip-rings 18 also consist of a plurality of sub-rings 19, which are separated from one another by spacing elements 23 which are distributed uniformly over the circumference. This allows the cooling medium or the cooling air not only to flow up between the slip-rings 18 and the spacer rings 21 but also "through" the slip-rings 18 themselves, that is to say through the annular gap sections, which are formed by the spacing elements 23, between the sub-rings 19. On the one hand, this results in a more homogeneous distribution of the cooling air and, on the other hand, the surface area via which heat is emitted is considerably enlarged.

Figure 5:
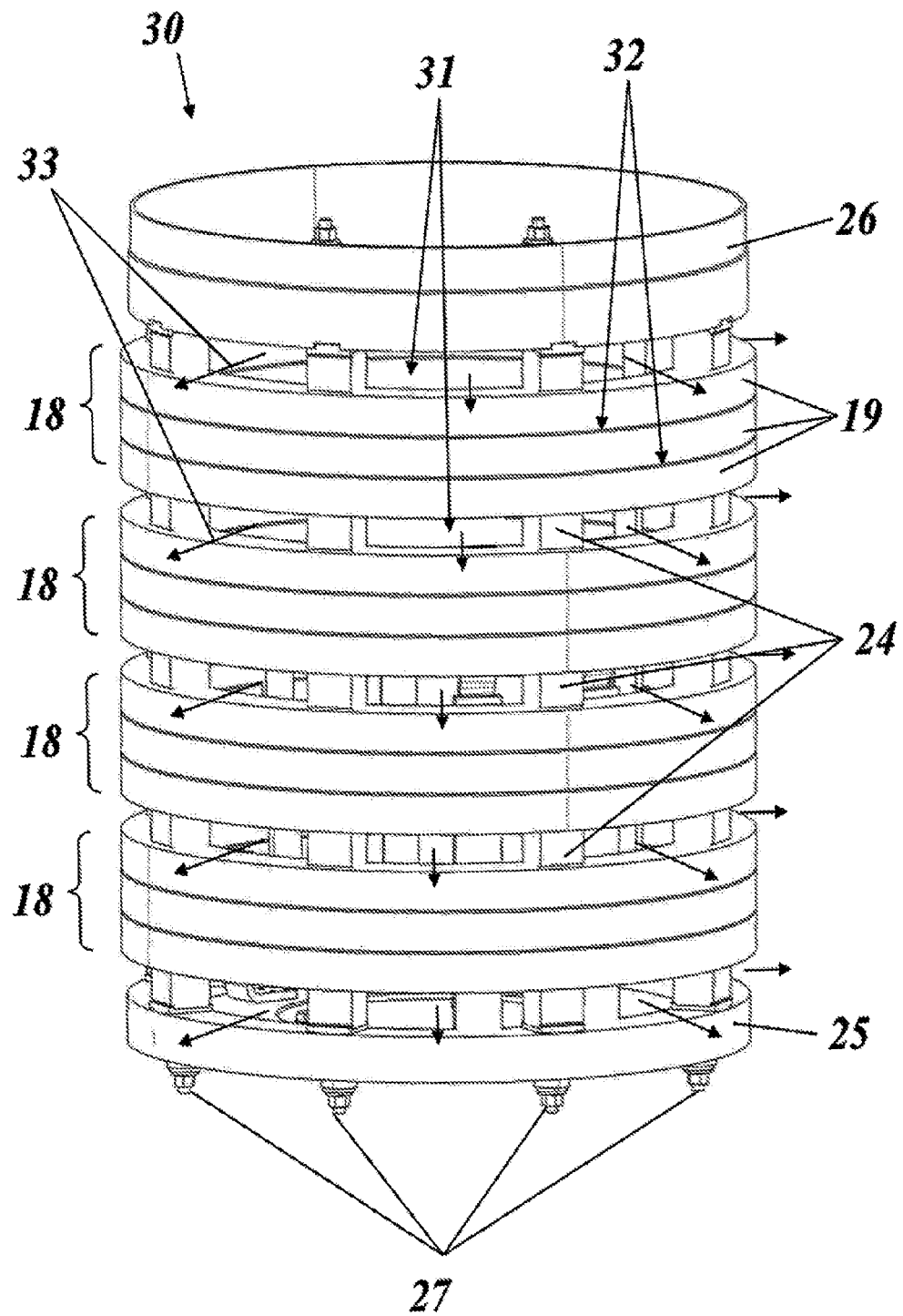
FIG. 5 shows a perspective side view of a slip-ring arrangement according to a second exemplary embodiment of the invention.
Figure 6:
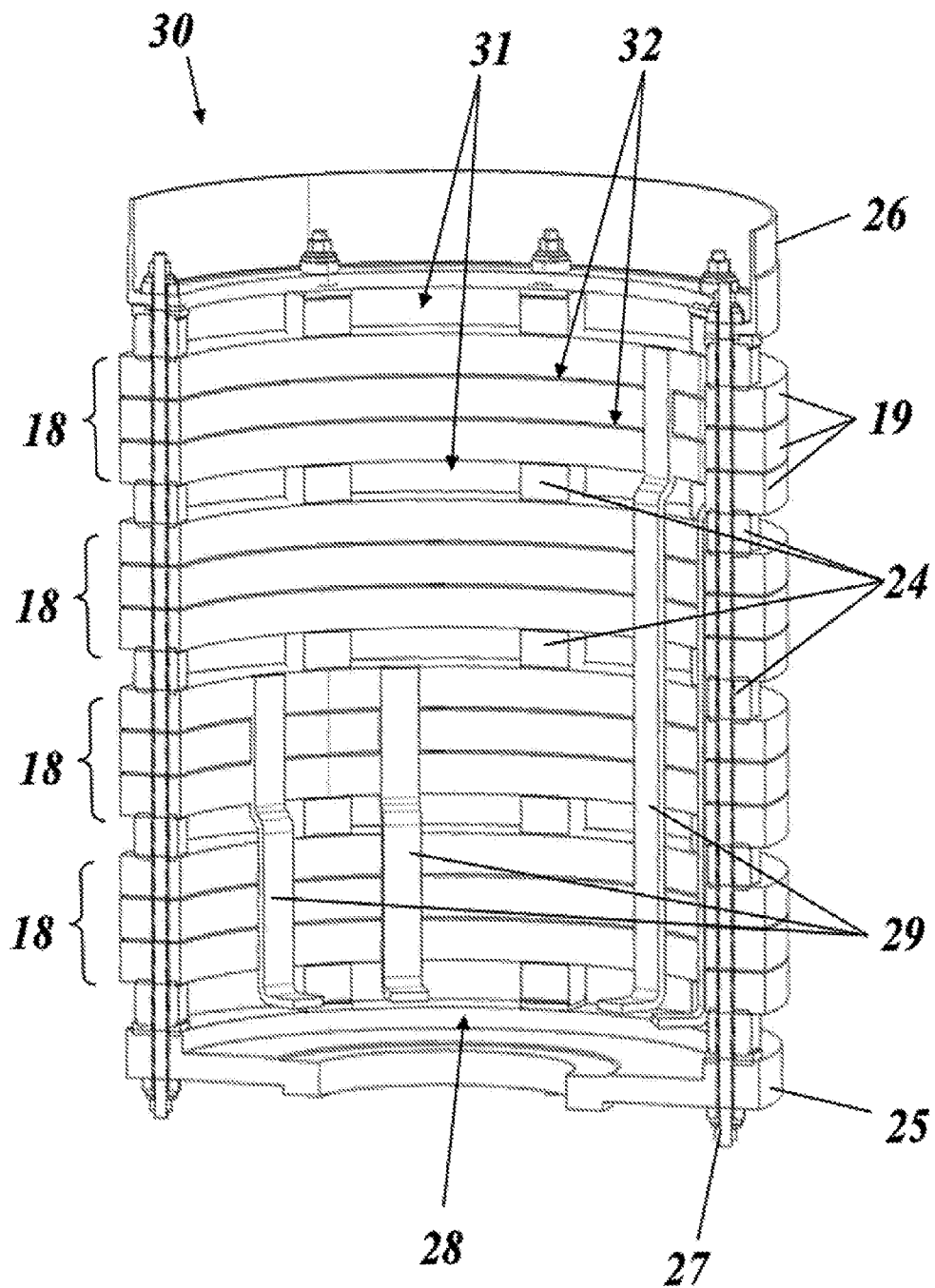
FIG. 6 shows a section through the slip-ring arrangement shown in FIG. 5.

However, the self-supporting embodiment of the slip-ring arrangement according to the invention also makes it possible to comply with the requirement to cool the output conductors, which are routed on the inside of the shaft or of the slip-rings. This can be seen from the exemplary embodiments of the invention illustrated in FIG. 5 and FIG. 6: The slip-ring arrangement 30 in FIGS. 5 and 6 is likewise designed in a self-supporting manner from four slip-rings 18, the four which are themselves each subdivided into three sub-rings 19. In this case, block-like spacing elements 24 distributed over the circumference are used instead of the spacer rings 21 in FIG. 3, in order to create the required separations and through-flow openings 31 between the individual slip-rings 18. This results in a larger opening cross section for the cooling air in this area.

In this exemplary embodiment as well, the sub-rings 19 are separated from one another by spacing elements, thus creating through-flow openings in the form of narrow annular gap sections, through which cooling air can flow. The self-supporting slip-ring arrangement 30 is held together by a plurality of axial tie bolts 27, which are arranged distributed over the circumference and are passed through the slip-rings 18, and sub-rings 19, and the spacing elements 24. The slip-rings 18 and sub-rings 19 and the spacing elements 24 arranged between the slip-rings 18 are pressed together by means of the tie bolts 27 between two end rings 25, 26, which act as pressing flanges, and thus form a mechanically robust unit. The through-flow openings 31 are also provided between the outer slip-rings 18 and the end rings 25 and 26, in order to ensure adequate cooling on the outside.

The slip-ring arrangement 30 surrounds an internal area 28, into which cooling air is introduced axially for cooling, and then emerges radially through the through-flow openings 31 and 32 (cooling medium 33 in FIG. 5). The output conductors 29, which are electrically connected to the slip-rings, can advantageously be laid in the internal area 28. Since all of the cooling air flows over the output conductors 29, they are cooled.

The spacing elements 24 and the spacer rings 21 should be designed to allow insulation, for electrical isolation of the slip-rings 18. This also applies to the tie bolts 27.

In addition to the improved cooling capability, material can also be saved in the described manner because there is no longer any need for a shaft to support the slip-rings 18. The material saved leads to a cost reduction, and contributes to reducing the load on the machine bearings. Since the slip-rings 18 are generally not located between the bearing points but outside them, they represent a major load on the bearings (tumbling movements). The weight reduction in this area makes it possible to advantageously reduce the forces which act on the bearings.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

| LIST OF REFERENCE SYMBOLS | |
|---|---|
| 10 | Rotating electrical machine (for example a synchronous machine) |
| 11 | Central body |
| 12 | Rotor laminated body |
| 13 | Rotor winding |
| 13' | Rotor end winding |
| 14, 18 | Slip-ring |
| 15 | Stator laminated body |
| 15' | Stator end winding |
| 16 | Shaft |
| 17 | Machine axis |
| 19 | Sub-ring |
| 20, 30 | Slip-ring arrangement |
| 21 | Spacer ring |
| 22, 23, 24 | Spacing element |
| 25 | End ring (inner) |
| 26 | End ring (outer) |
| 27 | Tie bolt |
| 28 | Internal area |
| 29 | Output conductor |
| 31, 32 | Through-flow opening |
| 33 | Cooling medium |

What is claimed is:

1. A slip-ring arrangement for a rotating electrical machine comprising:
a plurality of slip-rings disposed one behind the other in an axial direction and concentrically about an axis of the electrical machine, the plurality of slip-rings being self-supporting, and
a plurality of spacers, each of the spacers being disposed between respective adjacent ones of the plurality of slip rings, the plurality of slip-rings being connected to one another so as to form a plurality of through-flow openings configured to carry a cooling medium, each of the plurality of through-flow openings being disposed between the adjacent ones of the plurality of slip-rings;
wherein each of the plurality of slip-rings is subdivided into at least two separate sub-rings disposed concentrically one behind another and connected to one another so as to form a through-hole opening disposed between the at least two separate sub-rings for a cooling medium, a second plurality of spacers being disposed between the at least two separate sub-rings.

2. The slip-ring arrangement as recited in claim 1, wherein the cooling medium is cooling air.

3. The slip-ring arrangement as recited in claim 1, wherein the plurality of spacers includes a plurality of spacer rings, each of the spacer rings including a plurality of additional spacing elements distributed over a circumference of the slip-ring arrangement.

4. The slip-ring arrangement as recited in claim 3, wherein each of the plurality of additional spacing elements projects in the axial direction on opposing sides of a respective one of the plurality of spacer rings and is integrally formed on the respective one of the plurality of spacer rings.

5. The slip-ring arrangement as recited in claim 1, wherein each of the plurality of spacers includes a plurality of spacing elements distributed over a circumference of the slip-ring arrangement.

6. The slip-ring arrangement as recited in claim 5, further comprising a plurality of axial tie bolts distributed over the circumference and passing axially through the plurality of slip-rings and the plurality of spacing elements so as to hold the slip-ring arrangement together.

7. The slip-ring arrangement as recited in claim 6, wherein the plurality of axial tie bolts are configured to press the plurality of spacing elements and the plurality of slip-rings between two end rings configured as pressing flanges.

8. The slip-ring arrangement as recited in claim 1, wherein the cooling medium includes cooling air.

9. The slip-ring arrangement as recited in claim 1, wherein the plurality of second spacers includes a plurality of spacing elements distributed over a circumference of the at least two separate sub-rings.

10. The slip-ring arrangement as recited in claim 1, further comprising an output conductor routed from the plurality of slip-rings to a machine-side end of the slip-ring arrangement in an internal area surrounded by the slip-ring arrangement.

11. A method for cooling a slip-ring arrangement of a rotating electrical machine comprising:
arranging a plurality of slip-rings concentrically about an axis one behind the other in an axial direction and surrounding an interior, the plurality of slip-rings being self-supporting and subdivided into a plurality of sub-rings;
providing a plurality of spacers between adjacent ones of the plurality of slip-rings and providing a second plurality of spacers between adjacent ones of the plurality of sub-rings so as to form through-flow openings between the slip-rings and the sub-rings; and
introducing a cooling medium in the axial direction into the interior and such that the cooling medium emerges radially between the plurality of slip-rings and the sub-rings.

12. The method as recited in claim 11, wherein the cooling medium includes cooling air.

13. The slip-ring arrangement as recited in claim 1, comprising:
output conductors electrically connected to the slip-rings and arranged in an internal area of the slip rings and exposed to the cooling medium.

14. The method as recited in claim 11, comprising:
arranging at least one output conductor electrically connected to the slip-rings in an internal area of the slip rings and exposed to the cooling medium.

* * * * *